(12) United States Patent
Zhang

(10) Patent No.: US 8,448,553 B2
(45) Date of Patent: May 28, 2013

(54) CUTTING TOOL

(75) Inventor: Charlie Zhang, Oak Brook, IL (US)

(73) Assignee: D-Cut Products, Inc., Lombard, IL (US)

( * ) Notice: Subject to any disclaimer, the term of this patent is extended or adjusted under 35 U.S.C. 154(b) by 731 days.

(21) Appl. No.: 12/172,696

(22) Filed: Jul. 14, 2008

(65) Prior Publication Data

US 2009/0223067 A1 Sep. 10, 2009

Related U.S. Application Data

(60) Provisional application No. 61/034,863, filed on Mar. 7, 2008.

(51) Int. Cl.
*B26D 5/08* (2006.01)

(52) U.S. Cl.
USPC ............ 83/294; 83/607; 83/608; 83/609

(58) Field of Classification Search
USPC ............ 83/607–609, 545, 564, 468.3, 597, 83/614, 953
See application file for complete search history.

(56) References Cited

U.S. PATENT DOCUMENTS

| | | | | |
|---|---|---|---|---|
| 1,044,966 A * | 11/1912 | Adams et al. | ..................... | 83/607 |
| 2,164,688 A * | 7/1939 | Parsons et al. | ............... | 125/23.01 |
| 2,219,602 A * | 10/1940 | Rayner | ............................. | 83/607 |
| 2,391,598 A * | 12/1945 | Serdich | ............................. | 30/229 |
| 2,445,093 A * | 7/1948 | Von Cseh | .......................... | 83/449 |
| 2,496,018 A * | 1/1950 | Pearson | ............................ | 83/607 |
| 2,789,642 A * | 4/1957 | Schwork | ............................ | 83/608 |
| 3,134,285 A * | 5/1964 | Greene | ........................ | 83/468.3 |
| 3,180,194 A * | 4/1965 | Locke | .............................. | 83/373 |
| 3,279,295 A | 10/1966 | Teplitz | | |
| 3,393,595 A * | 7/1968 | Halverson et al. | .............. | 83/580 |
| 3,788,173 A * | 1/1974 | Keigley | ............................ | 83/554 |
| 4,189,966 A * | 2/1980 | Keigley | ............................ | 83/178 |
| 4,387,616 A * | 6/1983 | Ireland | ............................ | 83/608 |
| 4,510,834 A * | 4/1985 | Greene et al. | .................... | 83/453 |
| 4,700,937 A * | 10/1987 | Naylor | .......................... | 269/304 |
| 4,892,295 A * | 1/1990 | Keller | ................................ | 269/8 |
| 5,010,795 A * | 4/1991 | Kania | .............................. | 83/607 |
| 5,038,477 A * | 8/1991 | Parrow | .......................... | 30/253 |
| 5,251,524 A * | 10/1993 | Clifford | .......................... | 83/383 |
| 5,979,285 A * | 11/1999 | Rasmussen et al. | ............ | 83/676 |
| 6,796,212 B2 * | 9/2004 | Maekawa et al. | ................ | 83/886 |
| 7,210,474 B2 * | 5/2007 | Gaida et a | ........................ | 125/15 |
| 2007/0137453 A1 * | 6/2007 | Marcon | ............................ | 83/564 |

FOREIGN PATENT DOCUMENTS

| FR | 847 014 | 10/1939 |
|---|---|---|
| FR | 2 576 054 | 7/1986 |

* cited by examiner

*Primary Examiner* — Ghassem Alie
*Assistant Examiner* — Bharat C Patel
(74) *Attorney, Agent, or Firm* — Pauley Petersen & Erickson

(57) ABSTRACT

A cutting tool for cutting sheets of materials, such as, for example, sheets of building materials. The cutting tool includes a base defining a support surface. The base includes a slot extending through the support surface along at least a portion of the base. The cutting tool further includes a handle having a proximate end pivotally engaged with respect to the base. The handle is pivotally movable with respect to the base between an open position and a closed position. The cutting tool further includes a blade integrated or positioned with respect to the proximate end of the handle. The blade includes a plurality of generally flat cutting surfaces arranged in a polygonal profile. When the handle is in the closed position, the slot receives at least a portion of the blade.

16 Claims, 26 Drawing Sheets

CUTTING TOOL

CROSS REFERENCE TO RELATED APPLICATION

This application claims the benefit of U.S. provisional patent application, Ser. No. 61/034,863, filed on 7 Mar. 2008. This provisional patent application is hereby incorporated by reference herein in its entirety and is made a part hereof, including but not limited to those portions which specifically appear hereinafter.

BACKGROUND OF THE INVENTION

1. Field of the Invention

This invention relates to a cutting tool for cutting sheets of material, such as, for example, sheets of building materials. More specifically, this invention relates to a portable cutting tool including a base and a blade pivotally engaged with respect to the base and movable between an open position and a closed position, where the blade includes a plurality of cutting surfaces arranged in a polygonal profile.

2. Discussion of Related Art

Certain building materials, such as, for example, flooring materials, are provided as sheets or planks of various dimensions. When used on a job site, the sheets or planks must be customized to meet the specific requirements of the job site. For example, the sheets or planks must be cut to fit around edges or corners of a room and/or around fixtures. Various tools are currently used to cut sheets of building materials, but most are bulky, heavy, require power to be operated, produce large amounts of dust during the cutting process, and/or result in uneven or splintered cuts.

There is a need or a desire for an improved cutting tool for cutting sheets or planks of building materials. There is a need or a desire for a portable, non-power operated cutting tool able to cut sheets of building materials in a predictable and straight fashion without splintering, cracking or similar problems and providing fast, dust-free cutting.

SUMMARY OF THE INVENTION

The present invention provides a portable, non-power operated cutting tool for cutting sheets of building materials that cuts sheets of building materials in a straight fashion without splintering or cracking.

According to one embodiment of this invention, the cutting tool includes a base, a handle engaged with respect to the base and a blade positioned with respect to the handle.

The base defines a support surface and includes a slot extending through the support surface along at least a portion of the base. The handle has a proximate end pivotally engaged with respect to the base. The handle is pivotally movable with respect to the base between an open position and a closed position. The blade is positioned or integrated with respect to the proximate end of the handle and preferably includes a plurality of generally flat cutting surfaces arranged in a polygonal profile. Each generally flat cutting surface is preferably a straight segment. Each straight segment transitions into at least one other straight segment, and two adjacent straight segments form an angle of between about 90 degrees and 180 degrees.

When the handle is in the closed position, the slot receives at least a portion of the blade. The handle may further include a distal end opposite the proximate end. The distal end may include a hand grip allowing a user to grip the handle to operate the handle between the open position and the closed position.

The base may further include at least one support member, for example, legs or support walls, for supporting the base before and during cutting.

In one embodiment of this invention, the support surface comprises a plurality of serrations. The plurality of serrations may be positioned along both edges of the support surface directly adjacent of the slot. Alternatively or additionally, the support surface may include a friction material positioned with respect to the slot.

The cutting tool of this invention may further include a handle stop extending from the handle toward the base and contacting the base when the handle is in the closed position.

According to one embodiment of this invention, the base is separable into a first base member and a second base member along a longitudinal axis of the base.

The cutting tool further includes a bracket engaging the support surface. The bracket may be repositionably attachable at one of a plurality of engagement areas on the support surface. The bracket preferably includes at least one lug and each engagement area includes at least one lug slot accommodating the at least one lug.

According to another embodiment of this invention, the cutting tool includes a base defining a support surface, a slot extending through the support surface along a portion of the base, a plurality of serrations positioned along both edges of the support surface directly adjacent the slot, and a blade pivotally engaged with respect to the base and pivotally movable between an open position and a closed position. In the closed position, the slot preferably receives at least a portion of the blade. The blade preferably includes a plurality of generally flat cutting surfaces arranged to form a polygonal profile. Each generally flat cutting surface is a straight segment having a width and a length, wherein each straight segment transitions into at least one other straight segment and two adjacent straight segments form an angle of between about 90 degrees and 180 degrees.

The cutting tool further includes a hand grip formed with respect to the blade. The cutting tool may include a handle stop extending from the hand grip toward the base. The base may be separable into a first base member and a second base member along a longitudinal axis of the base. The cutting tool may further include a bracket engaging the support surface. The bracket may be repositionably attachable at one of a plurality of engagement areas on the support surface. The bracket may include a lug removably engageable with a corresponding lug slot formed in each engagement area of the support surface. The bracket may include a plurality of lugs and be repositionably attachable at one of the plurality of engagement areas on the support surface. Each engagement area may include a plurality of lug slots receiving the plurality of lugs to attach the bracket to the support surface.

The blade may define an aperture through a pivot end thereof, and the cutting tool may further include a fastener extending through the aperture and a corresponding openings defined by the base on both sides of the blade. In this arrangement, the blade pivots about the fastener.

DESCRIPTION OF THE INVENTION

Figure 25:
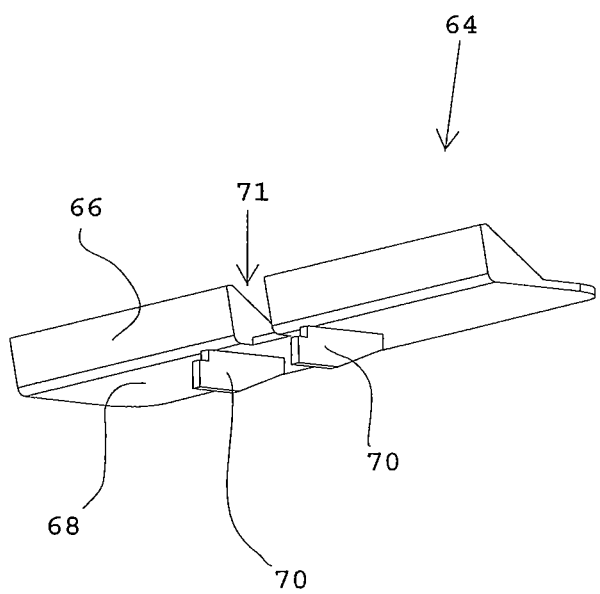
FIG. 25 is a perspective view of a bracket, according to one embodiment of this invention.
Figure 26:
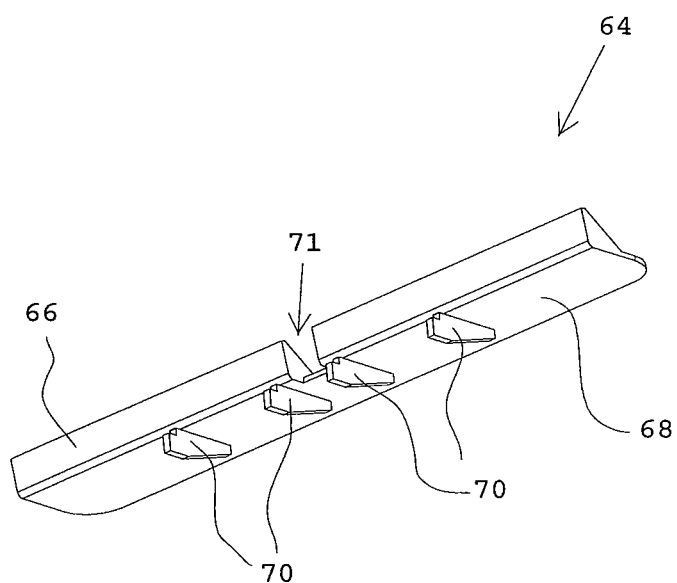
FIG. 26 is a perspective view of a bracket, according to another embodiment of this invention.

FIGS. 1-24 show various preferred embodiments of a cutting tool according to the invention, and FIGS. 25 and 26 show preferred embodiments of a bracket used with the cutting tool of this invention. According to one embodiment of this invention, the cutting tool is a laminate cutter. As used herein, "laminate" refers to a sheet or plank of building material, such as composite flooring or similar materials, including, but not limited to, one or more combinations of wood, fiber, concrete, plastic and/or other materials that may or may not include a laminated layer.

The cutting tool as described herein is desirably used to cut such laminate in a predictable and straight fashion without splintering, cracking or similar problems that may arise from such cuts. The cutting tool of this invention is non-power operated and provides fast, dust-free cutting of laminate. A worker may utilize the cutting tool according to this invention on a job site to cut flooring or similar materials to provide one or more cuts through the material for edges, corners and/or similar cuts required on a job site.

Those skilled in the art and following the teachings herein provided will appreciate that while the description below of various embodiments of a cutting tool of this invention refers to preferred configurations and uses, such configurations and uses are used for illustrative purposes only and may be modified as appropriate, depending on need.

FIGS. 1-12 show one preferred embodiment of the invention comprising a small, compact cutting tool that permits foldability and storage. FIGS. 13-24 show another preferred embodiment of the invention comprising a more robust footprint. FIG. 25 shows a bracket which can be used with the cutting tool shown in FIGS. 1-12, and FIG. 26 shows a bracket which can be used with the cutting tool shown in FIGS. 13-24.

With reference to FIGS. 1-24, the cutting tool 30 for cutting a sheet of material 33 includes a base 32 defining a support surface 34 and including a slot 36 extending through the support surface 34 along at least a portion of the base 32.

According to one embodiment of this invention, the cutting tool 30 includes a handle 44 pivotally attached with respect to the base 32. The handle 44 includes a blade 56 connected with respect to, or integrated with, a proximate end 46 of the handle 44, and a hand grip 50 formed with respect to, or integrated with, a distal end 48 of the handle 44. According to another embodiment of this invention, the cutting tool 30 includes a blade 56 pivotally attached with respect to the base 32 and connected to, or integrated with, a hand grip 50.

Figure 1:
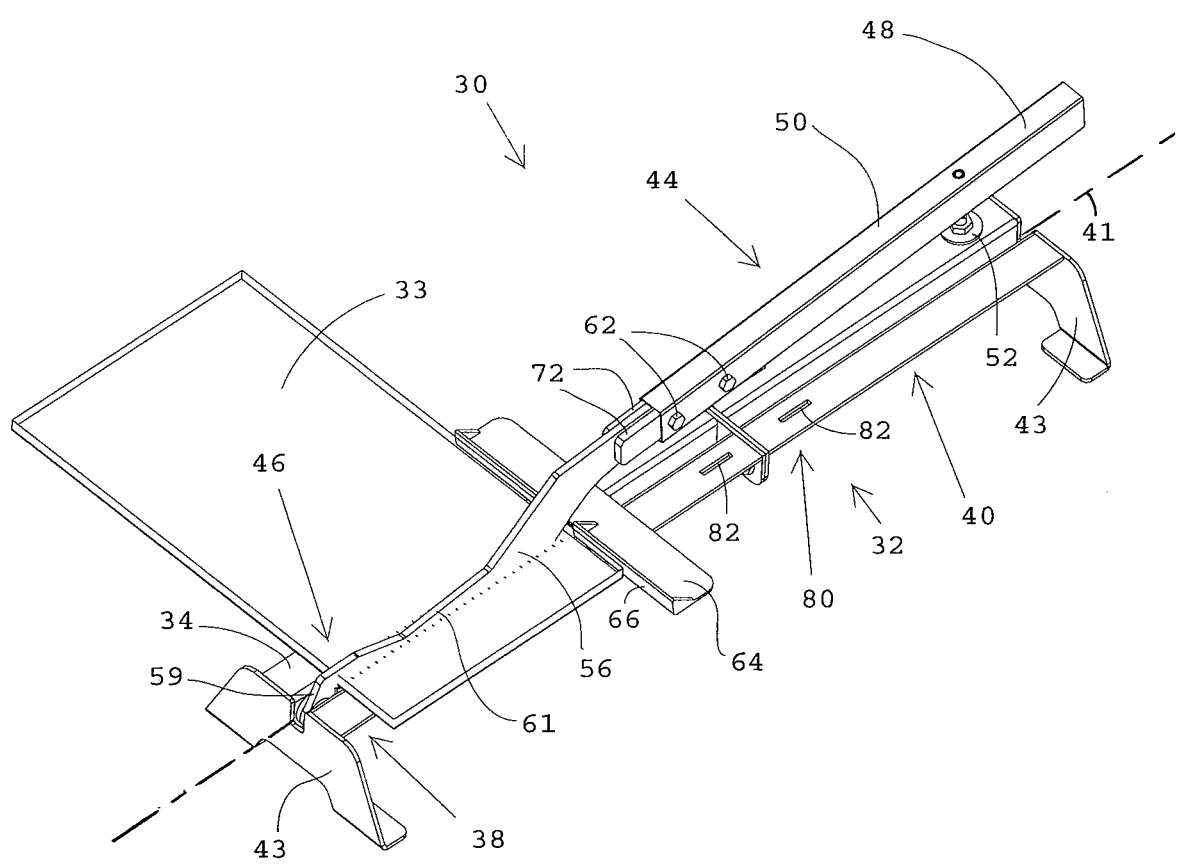
FIG. 1 is a top perspective view of a cutting tool according to one embodiment of this invention, shown with a sheet of material.
Figure 13:
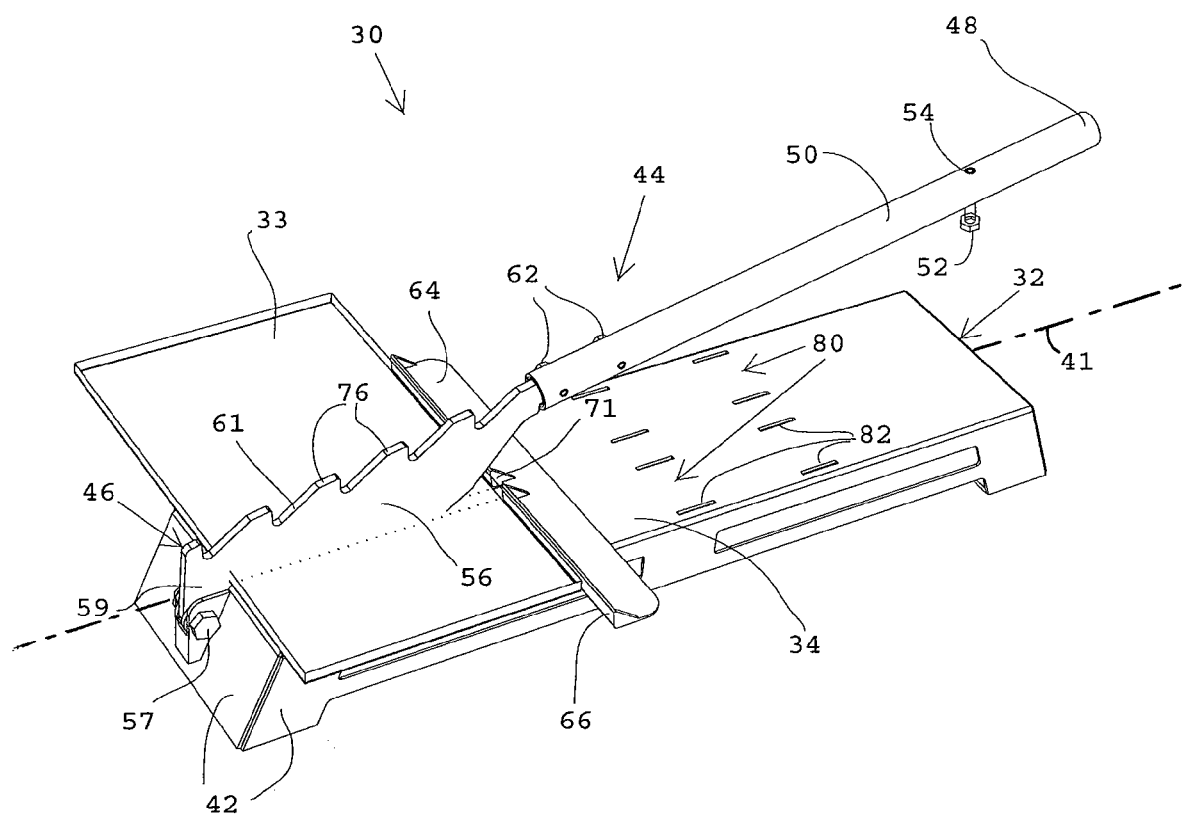
FIG. 13 is a top perspective view of a cutting tool according to another embodiment of this invention, shown with a sheet of material.

The sheet of material 33, as shown in FIGS. 1 and 13, is positionable on the support surface 34, for cutting. The support surface 34 desirably supports the sheet of material 33 before and during cutting. In certain embodiments of this invention, the support surface 34 is generally flat, as shown in FIGS. 2-8 and FIGS. 14-20. Alternatively, the support surface may be shaped to complement the surface of a sheet of building material, or otherwise shaped, depending on use.

The base 32 may be formed of steel or similar rigid material. As shown in FIGS. 1-3, 6, 8-9 and 11-12, the base 32 may be separable into a first base member 38 and a second base member 40 along a longitudinal axis 41 of the base 32. The base 32 may be disassembled into two or more base members, such as the first base member 38 and the second base member 40 shown in FIGS. 1-3, to permit and/or facilitate easier storage or transport. The first base member 38 may be attached to the second base member 40 by screws, such as base screws 39 shown in FIGS. 11-12, and/or other mechanical and/or non-mechanical attachment methods known to those skilled in the art. Although the preferred embodiment described herein shows a base separable into two base members, in other embodiments of this invention, the base may be separable into three or more base members, depending on need.

Figure 2:
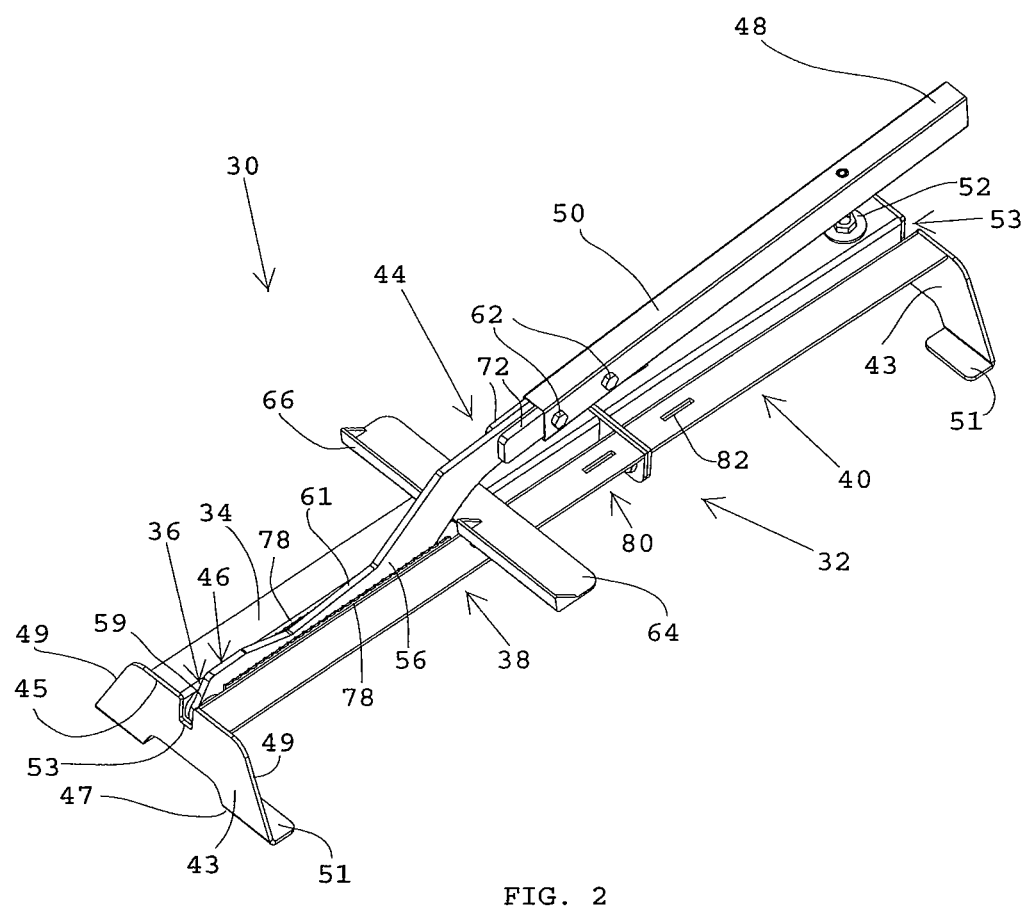
FIG. 2 is a top perspective view of the cutting tool shown in FIG. 1, without the sheet of material.

As shown in FIG. 2, the first base member 38 may include two longitudinal beams arranged in a spaced relationship with respect to each other to form the slot 36 therebetween. Similarly, as shown in FIG. 2, the second base member 40 may include two longitudinal beams. The longitudinal beams of the second base member 40 may also be arranged in a spaced relationship with respect to each other. The longitudinal beams extend along the longitudinal axis 41 of the base 32.

The base 32 may include one or more support members, such as legs 43 shown in FIG. 1, or support walls 42 shown in FIG. 13, providing stability to the cutting tool 30 before and during the cutting process. Support members also preferably keep the support surface 34 spaced from and suspended over the surface upon which the cutting tool 30 is placed for cutting, such as, for example, a ground, a floor or another surface. Such suspended configuration allows sufficient clearance for the blade 56 underneath the cutting tool and ensures that the blade 56 does not hit the ground or the floor when the handle 44 is in the closed position and/or during the cutting process. The one or more support members may be integrated with the base 32, or, alternatively, may be attached to the base 32 by screws, welding and/or any other method known to those skilled in the art.

Figure 5:
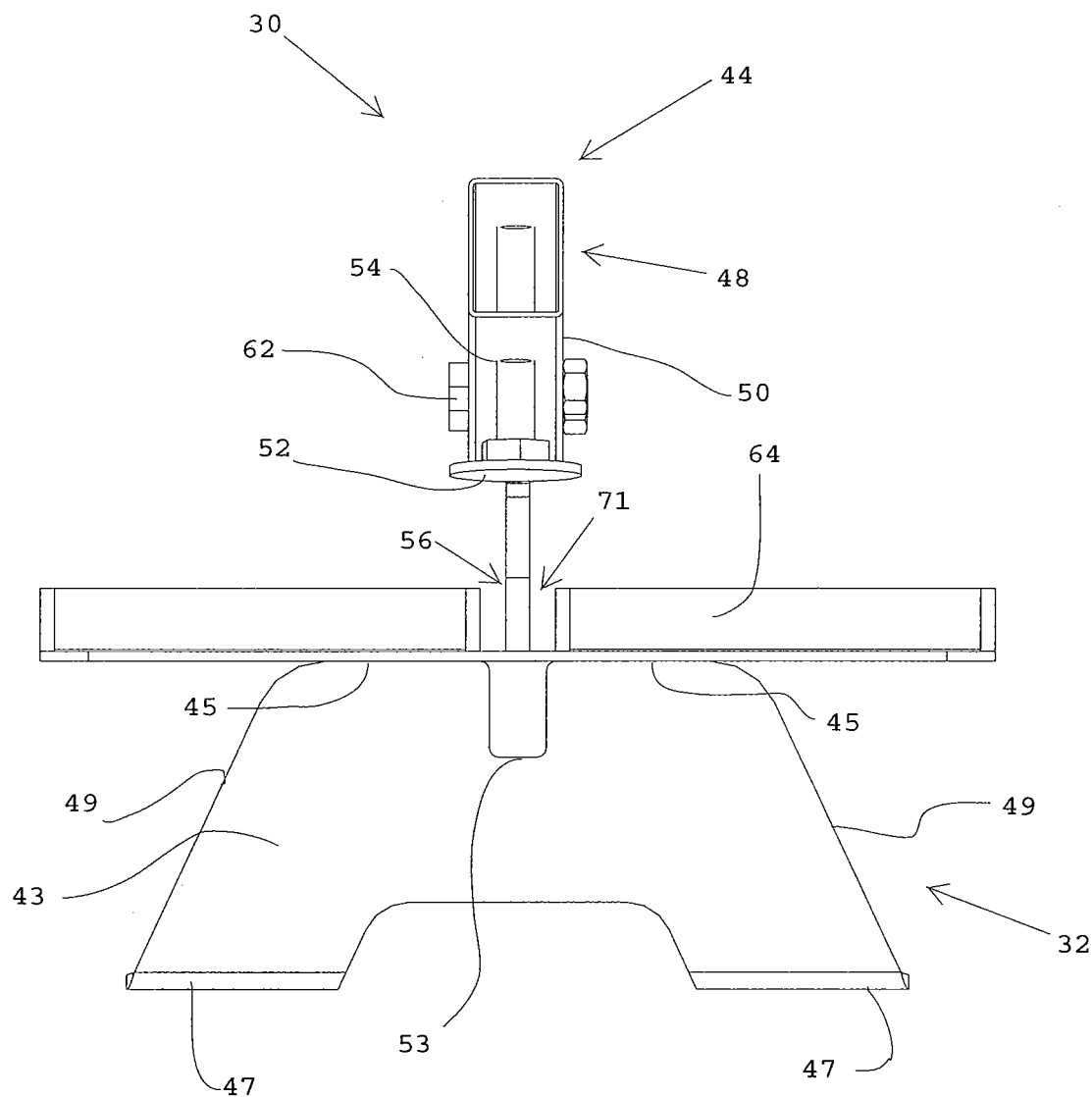
FIG. 5 is a back view of the cutting tool shown in FIG. 4.
Figure 7:
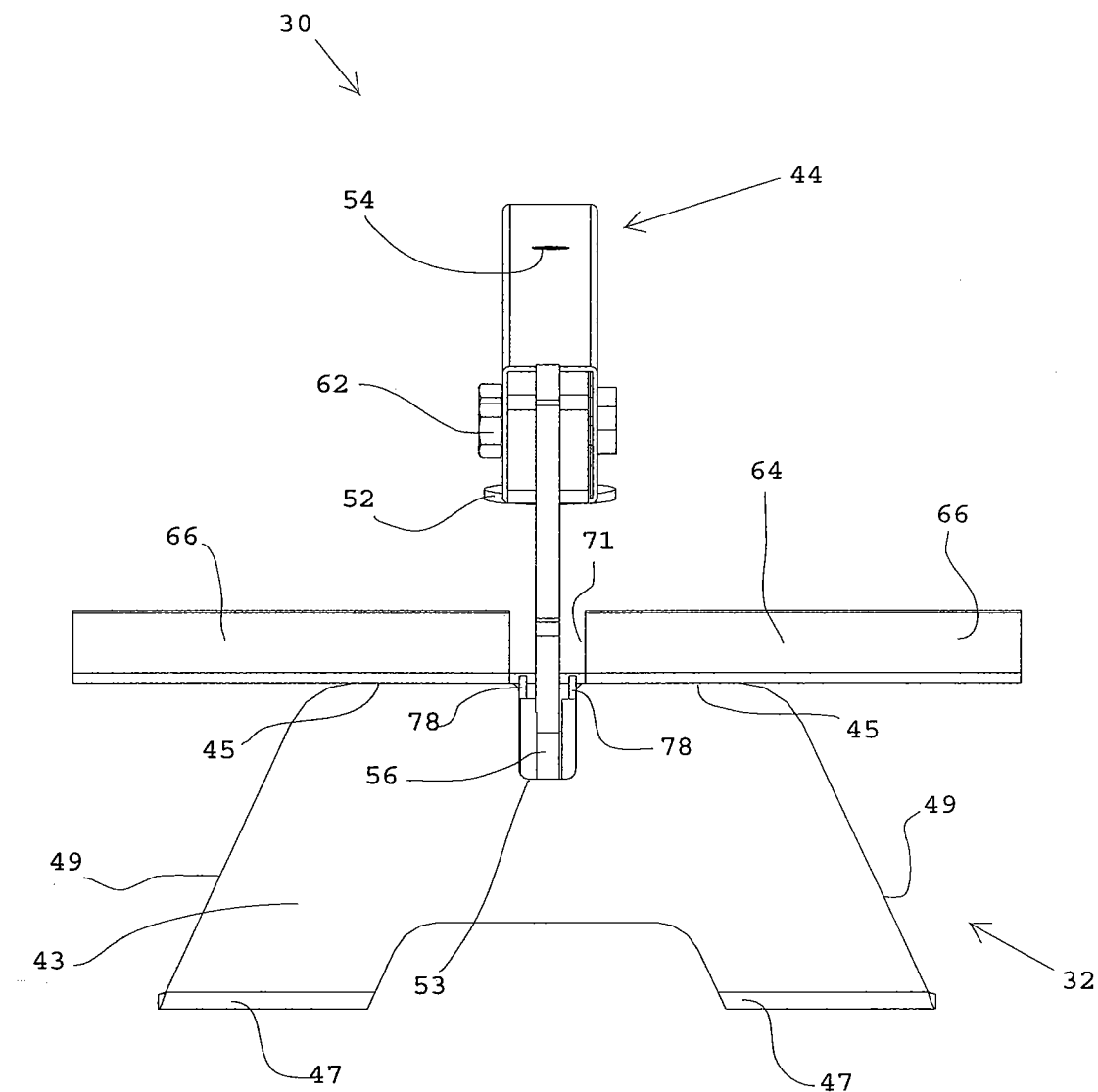
FIG. 7 is a front view of the cutting tool shown in FIG. 6.
Figure 8:
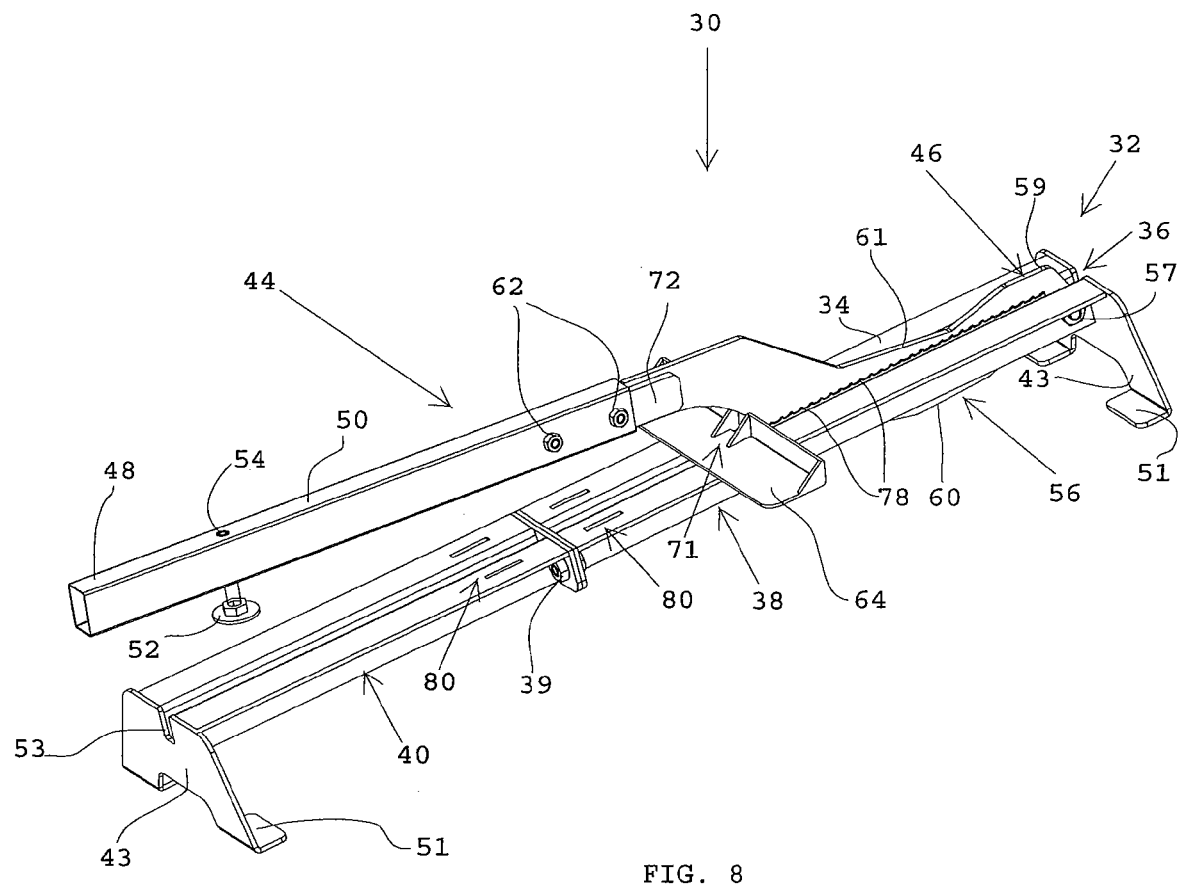
FIG. 8 is a top perspective view of the cutting tool shown in FIG. 2, shown from a different angle.
Figure 9:
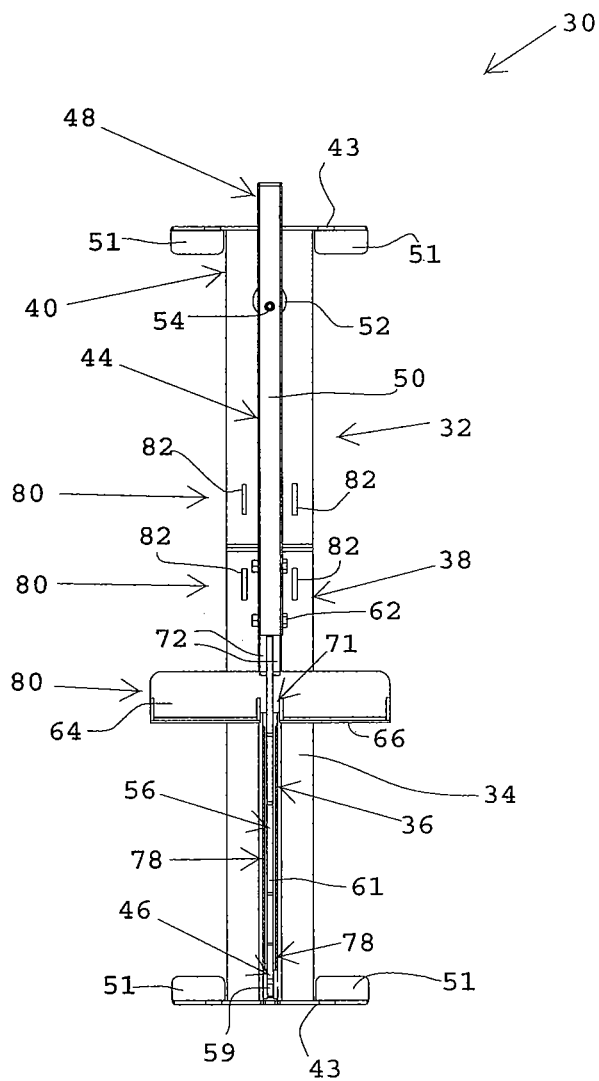
FIG. 9 is a top view of the cutting tool shown in FIG. 8.

As shown in FIGS. 2, 5, and 7, each leg 43 may include a top edge 45, a bottom edge 47 and two side edges 49. The top edge 45 may be flush with the support surface 34. Alternatively, the top edge 45 may extend beyond and above the support surface 34 to provide a contact surface for the sheet of material 33. Each leg 43 may include a U-shaped groove 53 formed in or defined by the top edge 45. The groove 53 may provide, if necessary, the required clearance for the blade 56 during operation of the blade 56 between the closed position and the open position. Each side edge 49 may extend at an angle of about 90 degrees or greater with respect to the top edge 45. As shown in FIG. 2, the bottom edge 47 may extend into and form one or more flanges 51, extending generally parallel with respect to the support surface 34, and providing added support and stability to the cutting tool 30.

Figure 14:
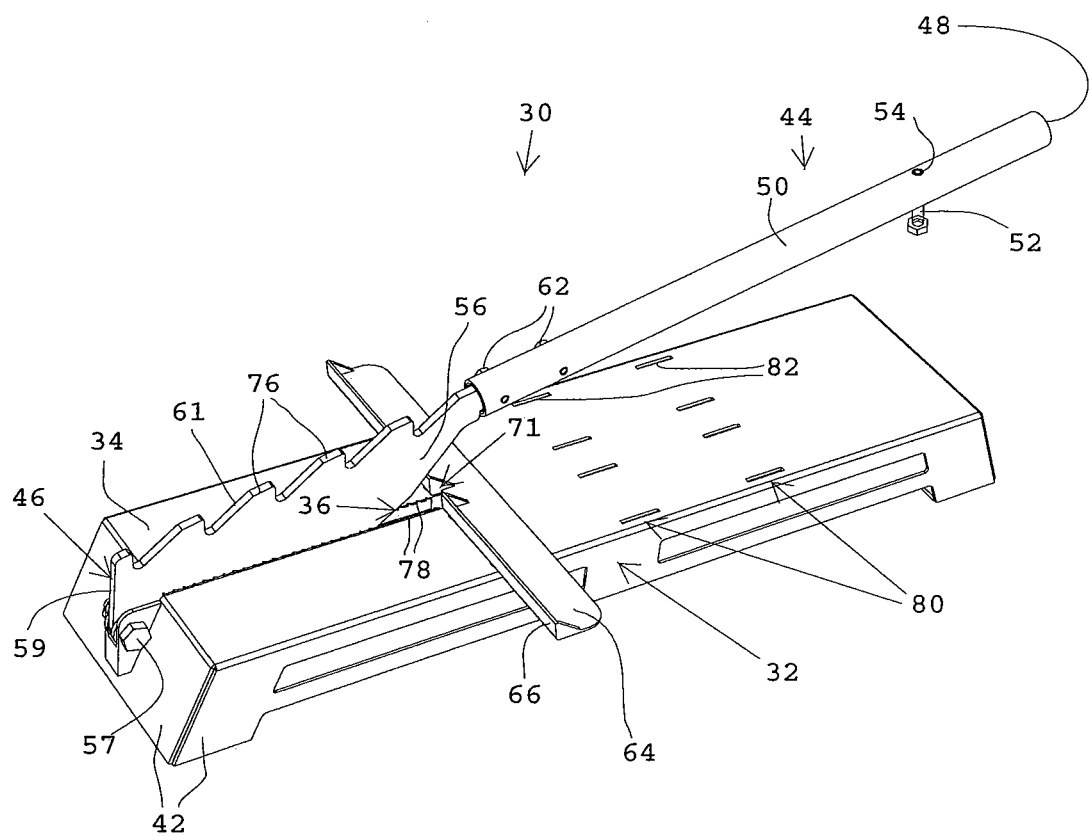
FIG. 14 is a top perspective view of the cutting tool shown in FIG. 13, without the sheet of material.
Figure 23:
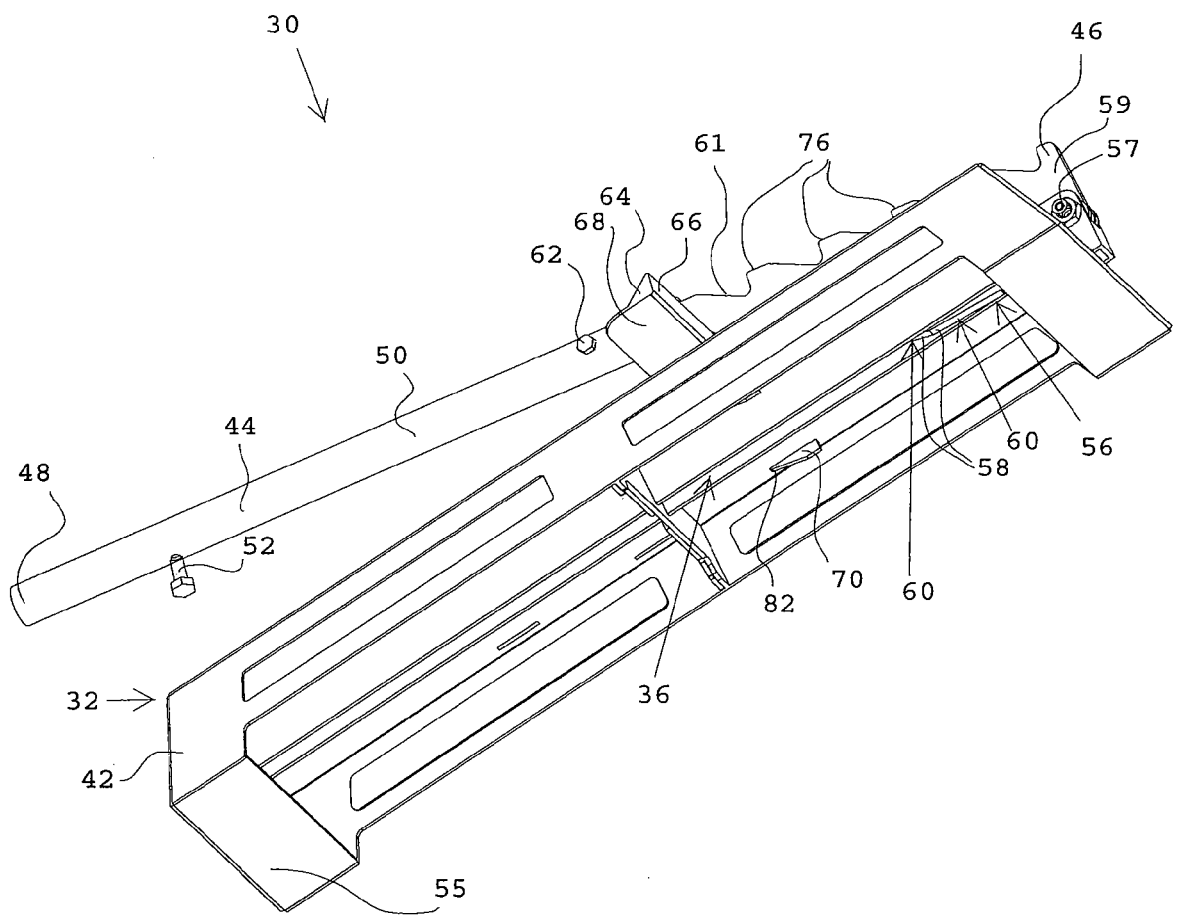
FIG. 23 is a bottom perspective view of the cutting tool of FIG. 21.
Figure 24:
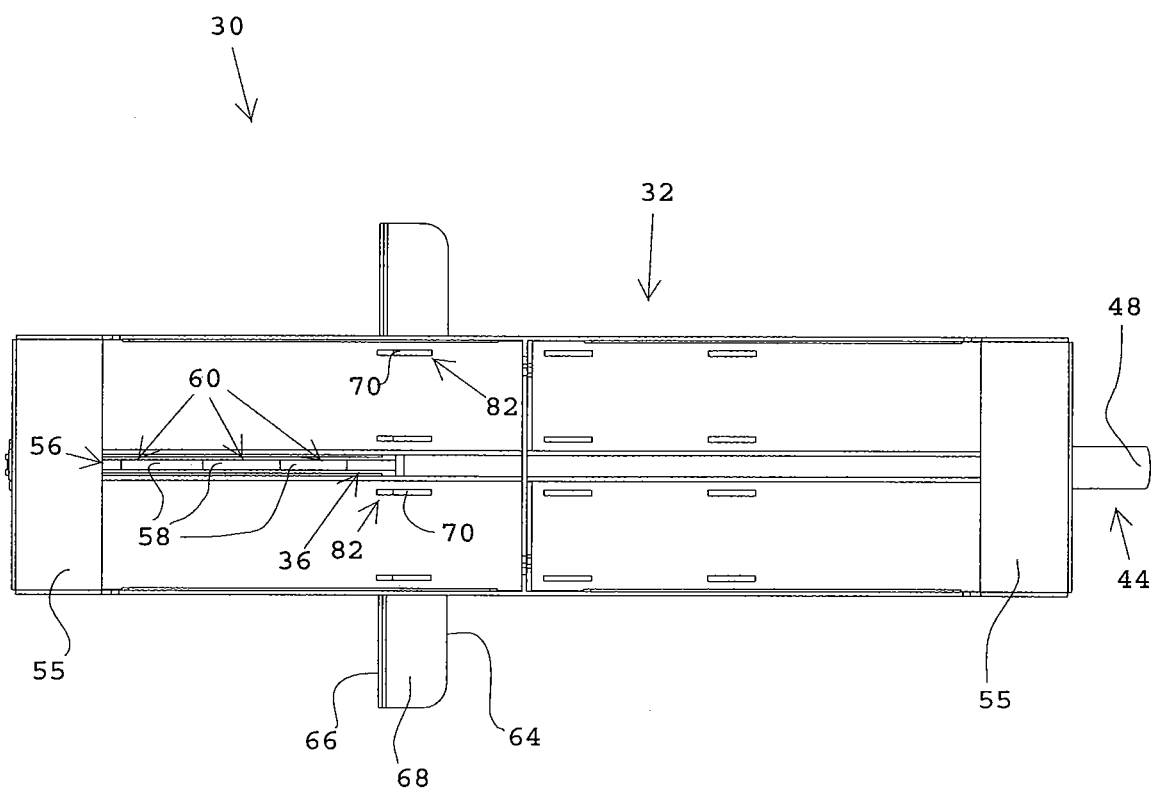
FIG. 24 is a bottom view of the cutting tool shown in FIG. 23.

As shown in FIGS. 14 and 23, the base 32 may include support walls 42, extending from and supporting all four sides of the base 32. The base 32 may further include one or more bottom walls 55, as shown in FIG. 23, connected to one or more support walls 42. Bottom walls 55 may be positioned parallel to the support surface 34 and provide a non-slip surface to prevent movement of the cutting tool 30 during the cutting process.

Figure 17:
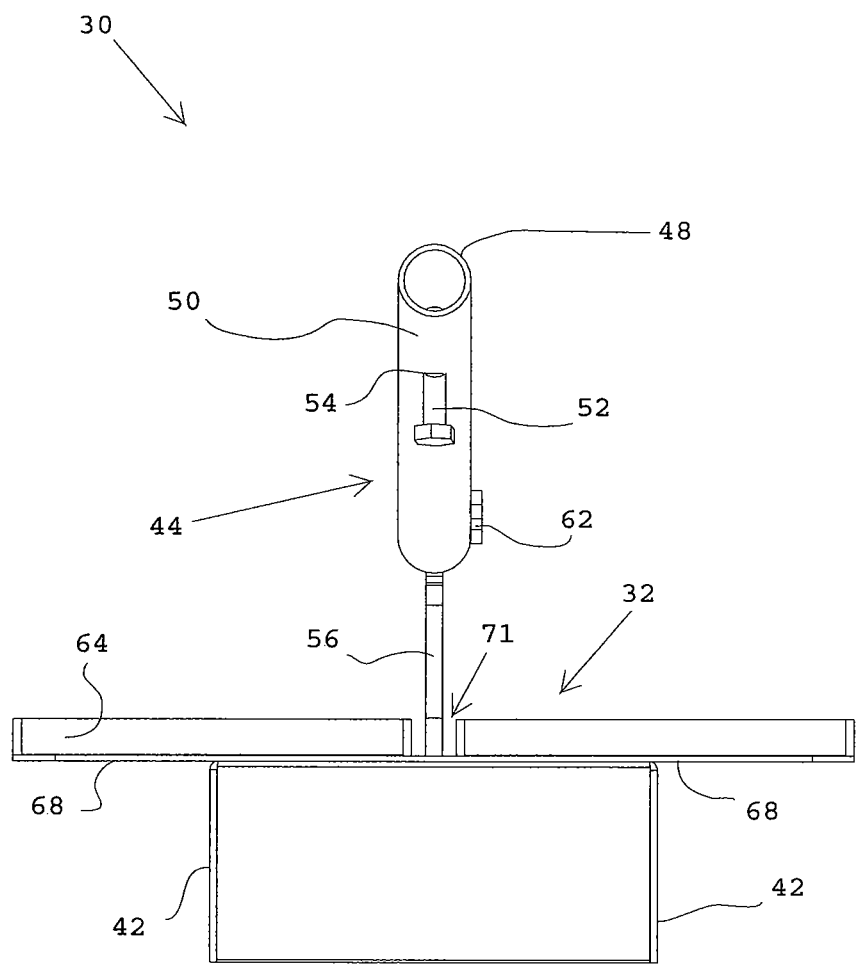
FIG. 17 is a back view of the cutting tool shown in FIG. 15.
Figure 18:
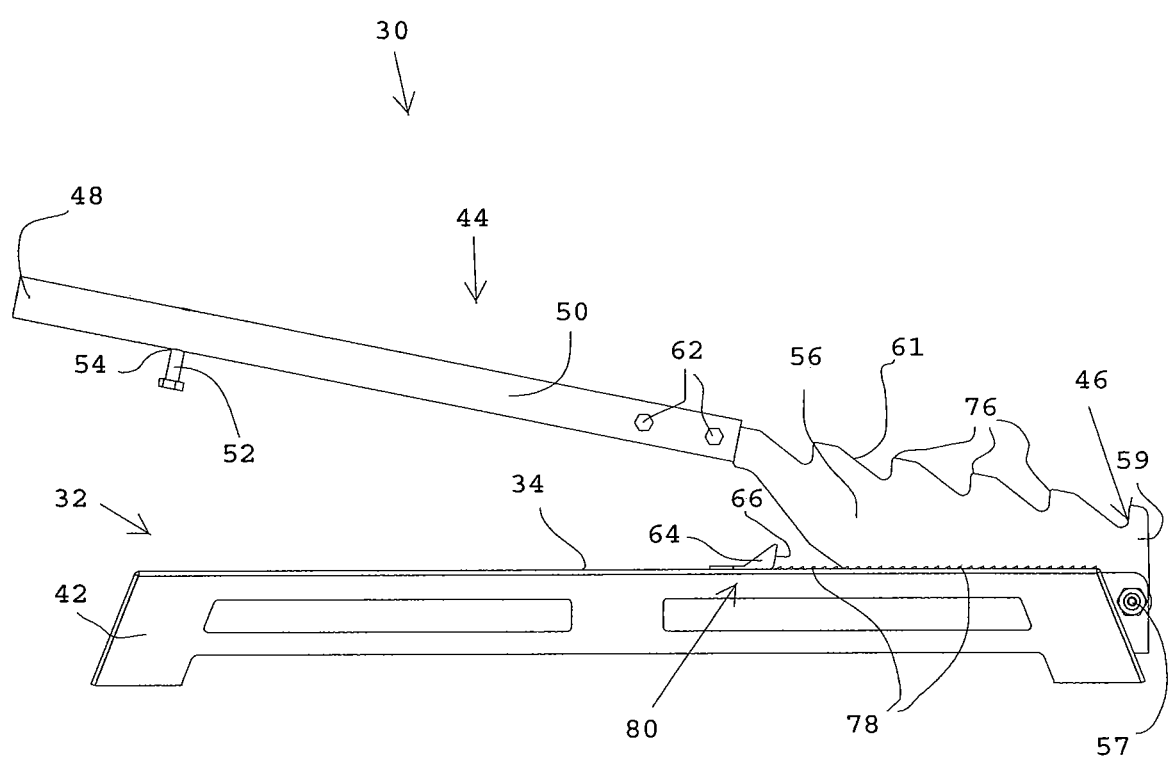
FIG. 18 is a side view of the cutting tool shown in FIG. 15, showing the side opposite the side shown in FIG. 15.
Figure 19:
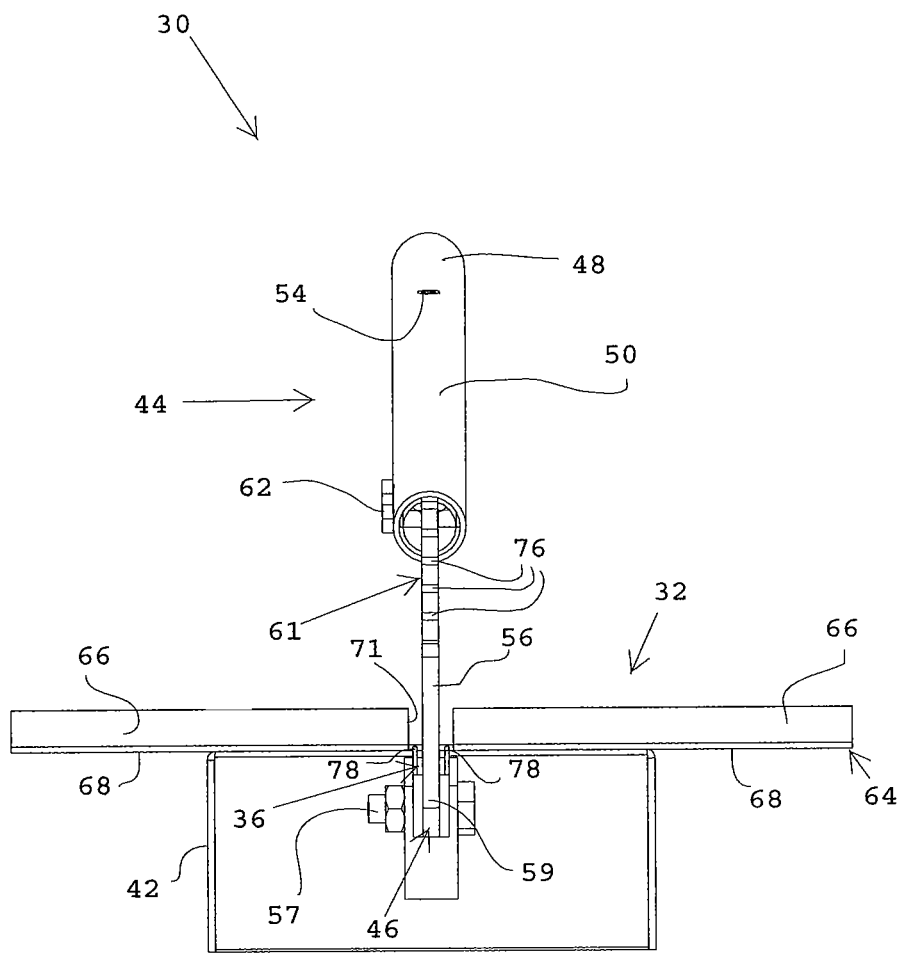
FIG. 19 is a front view of the cutting tool shown in FIG. 18.
Figure 20:
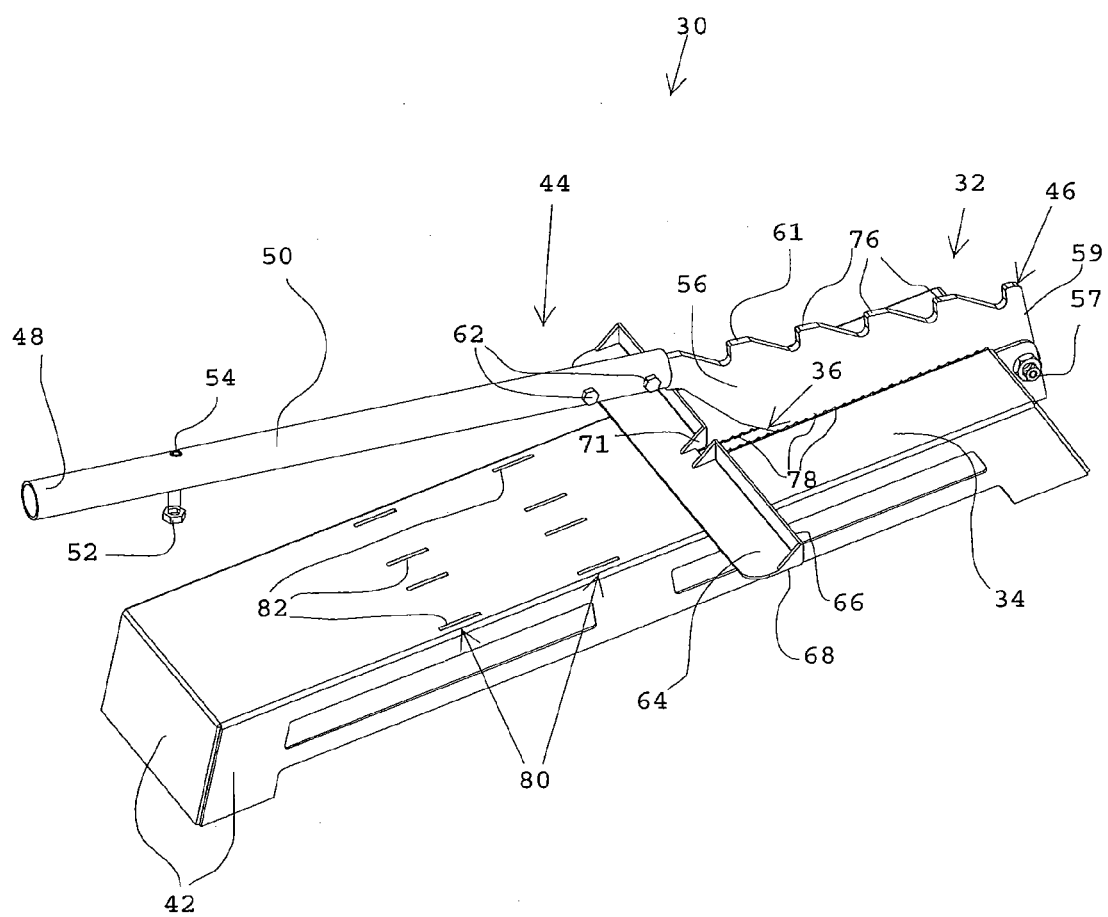
FIG. 20 is a top perspective view of the cutting tool shown in FIG. 14, shown from a different angle.
Figure 21:
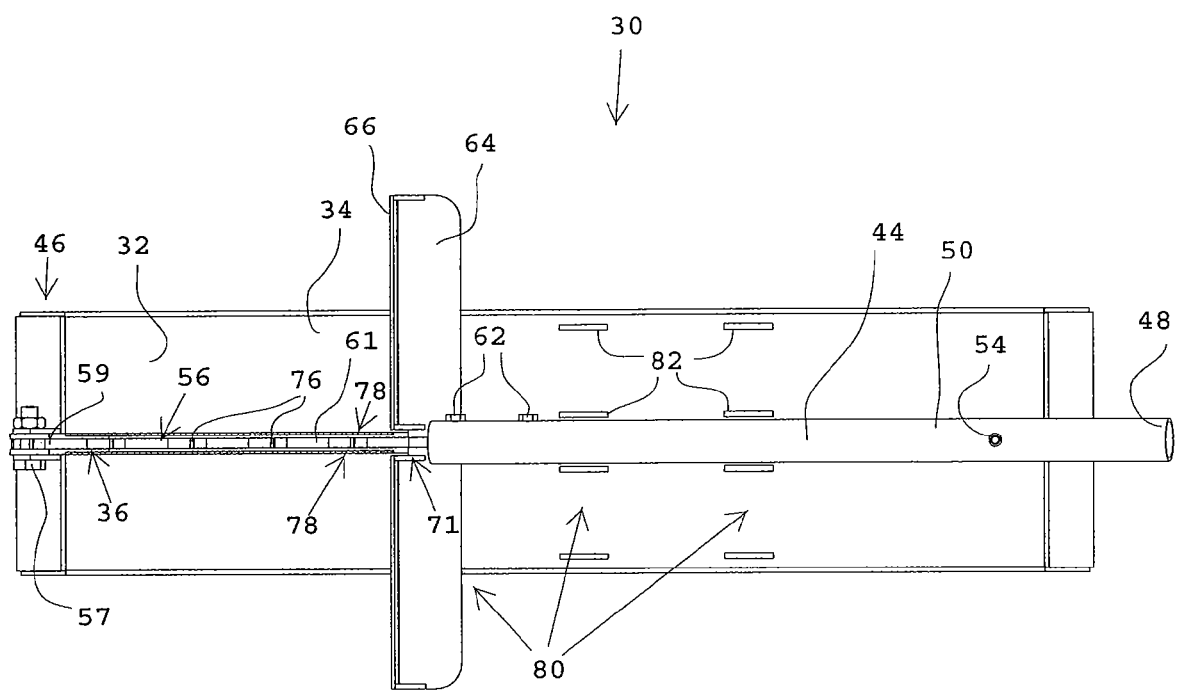
FIG. 21 is a top view of the cutting tool shown in FIG. 20.
Figure 22:
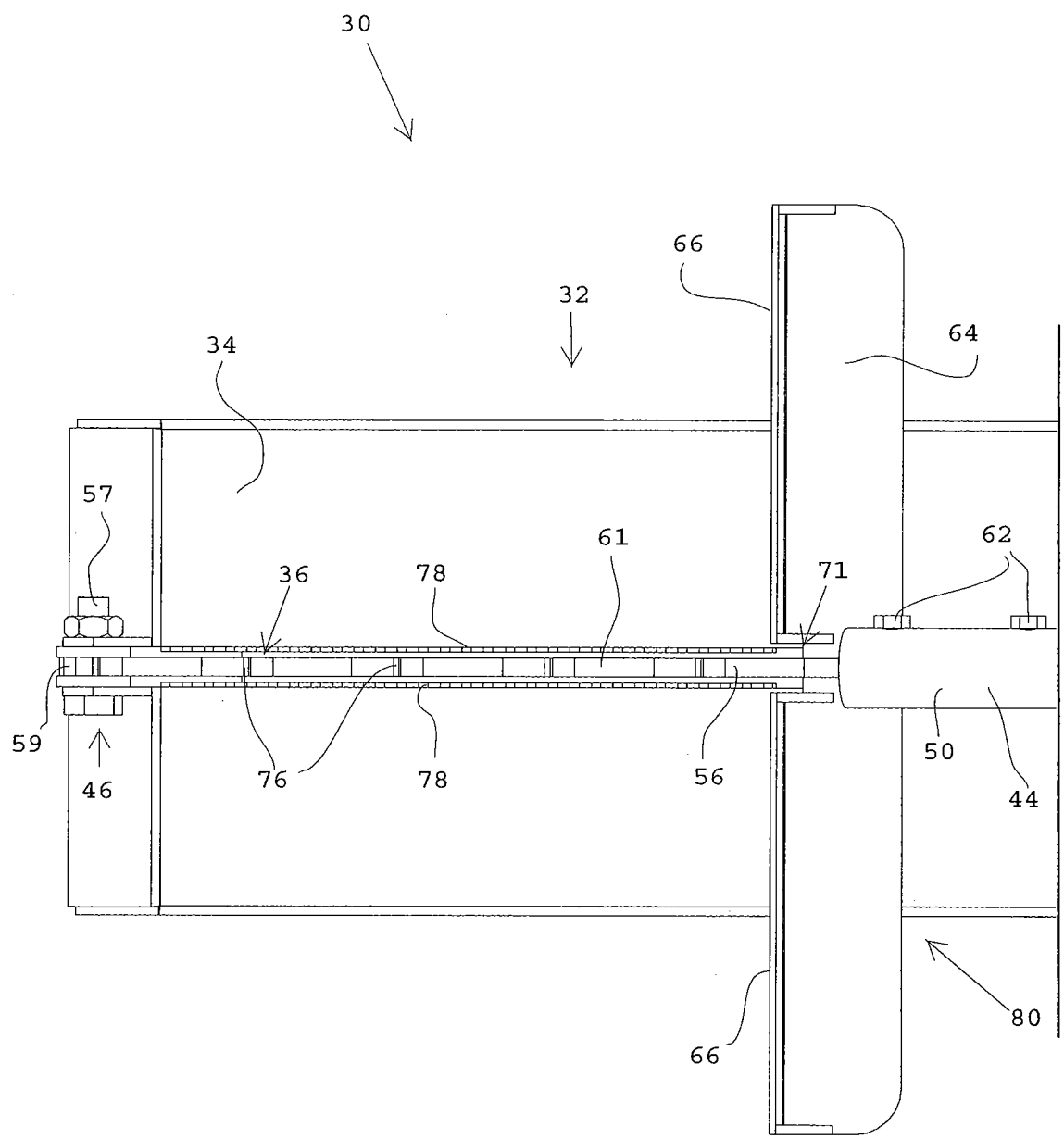
FIG. 22 is an exploded top view of the cutting tool shown in FIG. 21.

As shown in FIG. 1, the cutting tool 30 further includes a handle 44 having a proximate end 46 and an opposing distal end 48. The proximate end 46 is pivotally engaged with respect to the base 32, and the handle 44 is pivotally movable with respect to the base 32 between an open position and a closed position. In the closed position, the handle 44 is closest to the base 32. In the open position, the handle 44 is furthest away from the base 32. The proximate end 46 is preferably pivotally attached to the base 32, and the handle 44 extends from the base 32. The proximate end 46 includes a blade 56, and the distal end 48 includes a hand grip 50. The hand grip 50 may include a knurled or gripped surface for a comfortable and positive grip. The blade 56 may be integrated with the hand grip 50. Alternatively, the blade 56 may be attached to the hand grip 50 by screws, such as handle screws 62 shown in FIGS. 1, 6 and 10, or by any other attachment method know to those skilled in the art. The hand grip 50 may be a rectangular tubular cylinder, as shown in FIGS. 1 and 5, or a round tubular cylinder, as shown in FIGS. 13 and 17. The hand grip 50 may partially overlap an end of the blade 56 such that handle screws 62 can extend through the end of the blade 56 and the overlapping end of the hand grip 50, as shown in FIGS. 1, 4, 6 and 10. One or more strut members 72 may be positioned on either side of the blade 56, as shown in FIG. 1, to fill the gap formed between the blade and the inside surface of the tubular hand grip 50. Strut members 72 are preferably sized to have a positive engagement with the blade 56 and the hand grip 50. Handle screws 62 extend through the strut members 72.

The proximate end 46 includes the blade 56 and is preferably attached at or near the base 32. The proximate end 46 of the handle 44 and/or the pivot end 59 of the blade 56 may include an aperture therethrough, such as blade aperture 74 shown in FIGS. 4 and 16. The cutting tool 30 may further comprise a fastener, such as blade screw 57 shown in FIGS. 11 and 21, or a similar fastener, extending through the blade aperture 74 and permitting a pivotal engagement between the handle 44 and/or the blade 56 and the base 32. The blade screw 57 may extend through corresponding apertures formed in or defined by the base 32 on either side of the blade 56 and/or the proximate end 46 of the handle.

Figure 4:
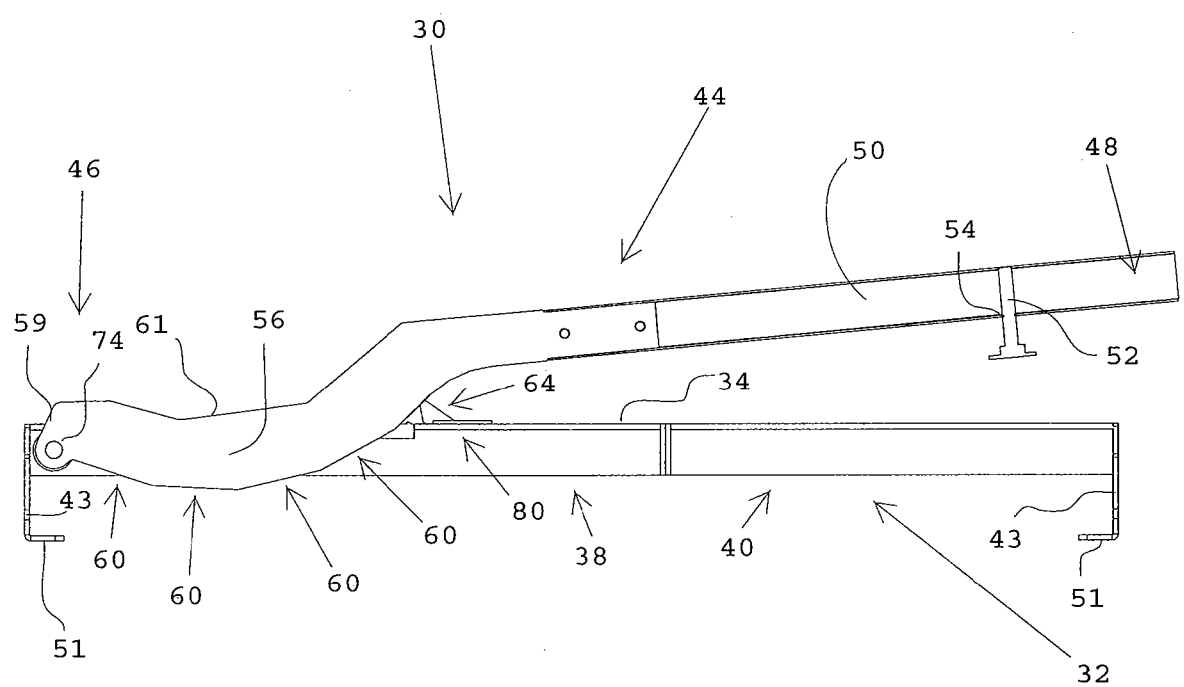
FIG. 4 is a cross-sectional view of the cutting tool shown in FIG. 3.

The handle 44 may further include a handle stop 52 extending away from the handle 44, as shown in FIGS. 1 and 13. The handle stop 52 may contact the base 32 following a full rotation of the handle 44 and thereby prevent the handle 44 from damaging either the base 32 or the sheet of material 33. In one embodiment of this invention, as shown in FIG. 4, the handle stop 52 is a screw having a threaded shaft and a head. The threaded shaft is engageable with a threaded aperture 54 defined by the hand grip 50, such that a portion of the screw extends from the hand grip 50 toward the base 32. The head of the screw may contact the base 32 when the handle 44 is in the closed position.

Figure 3:
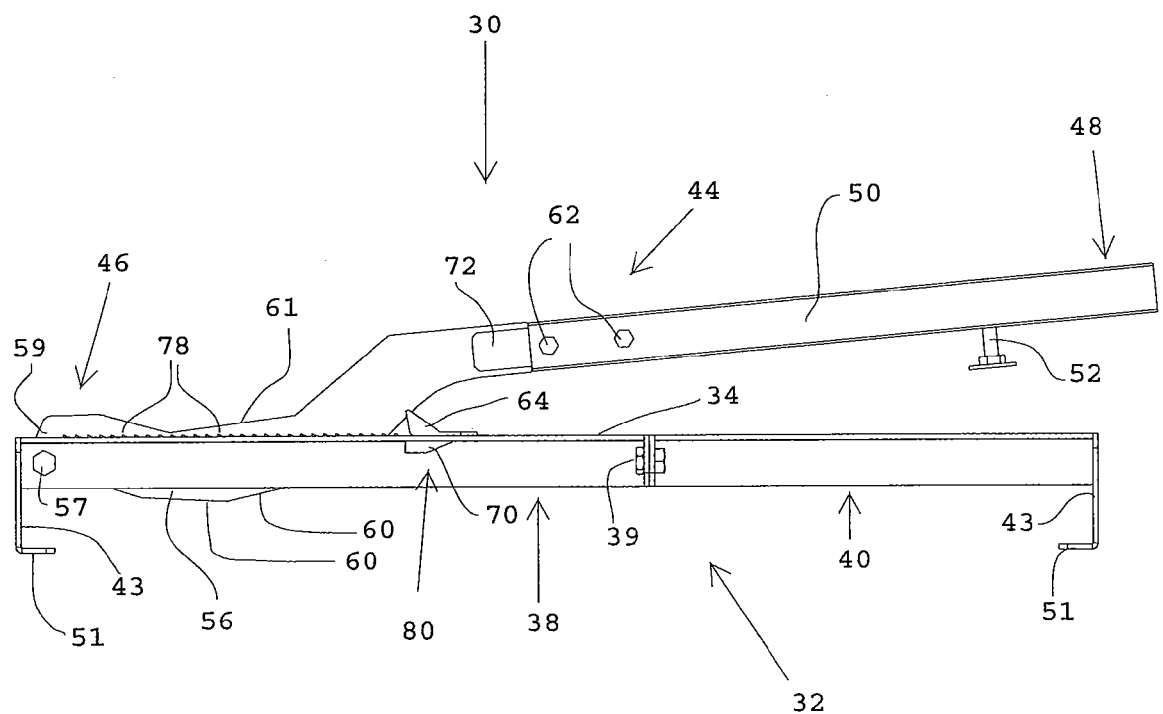
FIG. 3 is a side view of the cutting tool shown in FIG. 2.

The cutting tool 30 further includes a blade 56. In one embodiment of this invention, the blade 56 is positioned or integrated with and/or forms the handle 44. The blade 56 may be positioned or integrated with and/or form the proximate end 46 of the handle 44. As best shown in FIGS. 2-4, the handle 44 may be formed by coupling the blade 56 and the hand grip 50, as previously discussed.

Figure 11:
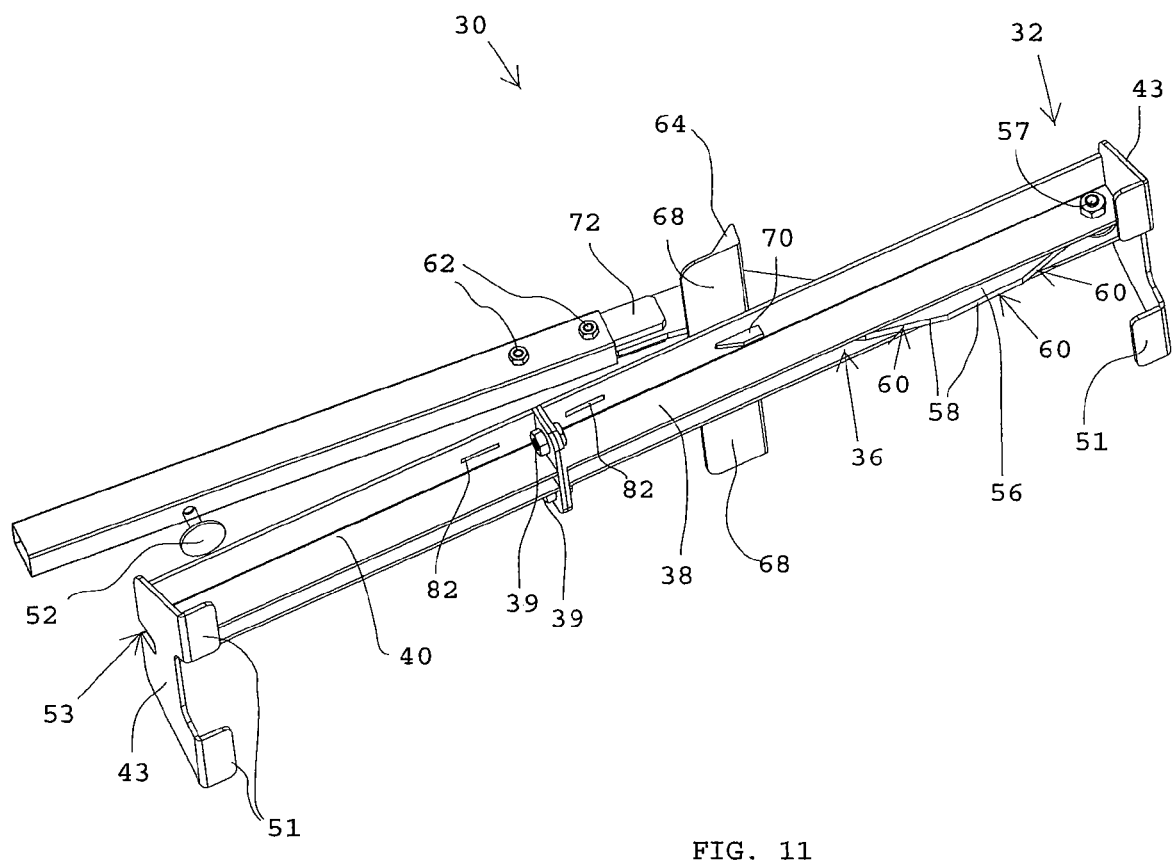
FIG. 11 is a bottom perspective view of the cutting tool of FIG. 9.
Figure 12:
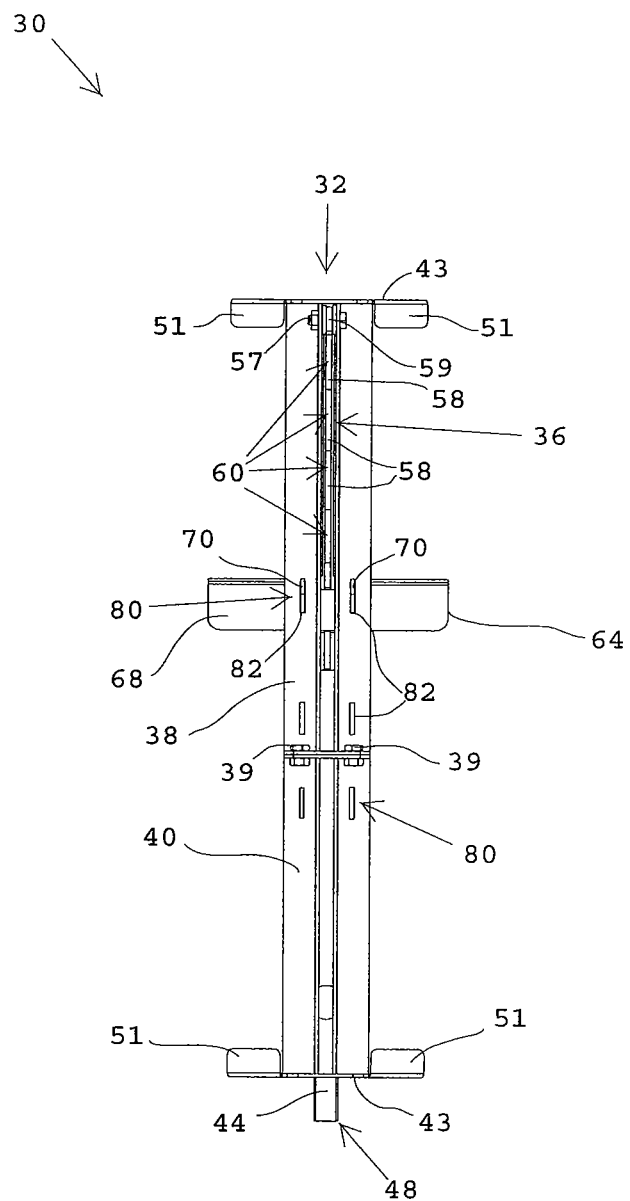
FIG. 12 is a bottom view of the cutting tool shown in FIG. 11.
Figure 16:
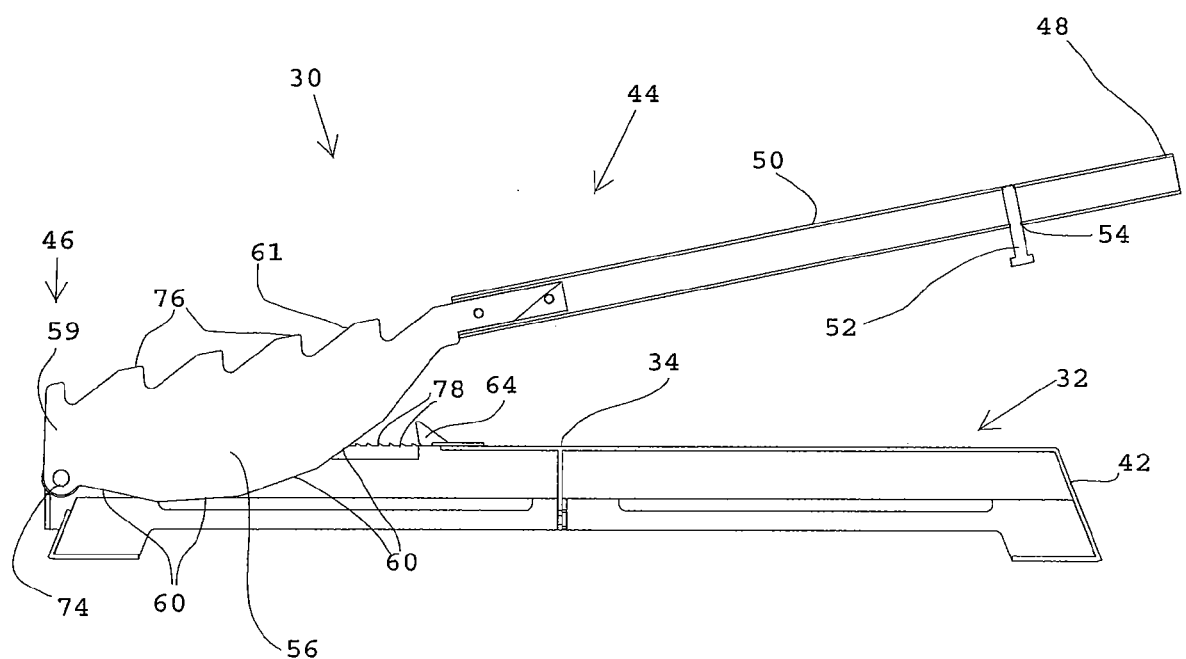
FIG. 16 is a cross-sectional view of the cutting tool shown in FIG. 15.

While many conventional cutting blades include a V-shaped cutting edge, the blade 56 of this invention preferably includes a plurality of generally flat cutting surfaces 58 arranged in a polygonal profile. The polygonal profile is preferably a convex polygonal profile as shown in FIGS. 4 and 16. In one embodiment of this invention, each generally flat cutting surface 58 is a straight segment 60 having a length oriented in the longitudinal direction of the blade 56 and a width oriented perpendicular to the length, as best shown in FIGS. 11 and 12. Each straight segment 60 transitions, along its length, into at least one other straight segment 60 and any two adjacent straight segments form an angle of between about 90 degrees and 180 degrees. In other words, the blade 56, as best shown in FIG. 11, preferably includes a plurality of generally flat cutting surfaces 58 and, as best shown in FIG. 4, preferably includes a polygonal profile comprising a series of straight transitions formed about a generally 180 degrees from the proximate end 46 to a position along the handle 44. The blade 56 is preferably formed of a steel material capable of repeatedly cutting all thicknesses and compositions of laminate material.

In one embodiment of this invention, as shown in FIGS. 2 and 3, the top edge 61 of the blade 56, opposite cutting surfaces 58, may also include a plurality of straight segments, similar to straight segments 60 discussed above, arranged to form a polygonal profile. In one embodiment of this invention, as shown in FIG. 4, the polygonal profile formed by the top edge 61 of the blade 56 is a concave polygonal profile.

Figure 15:
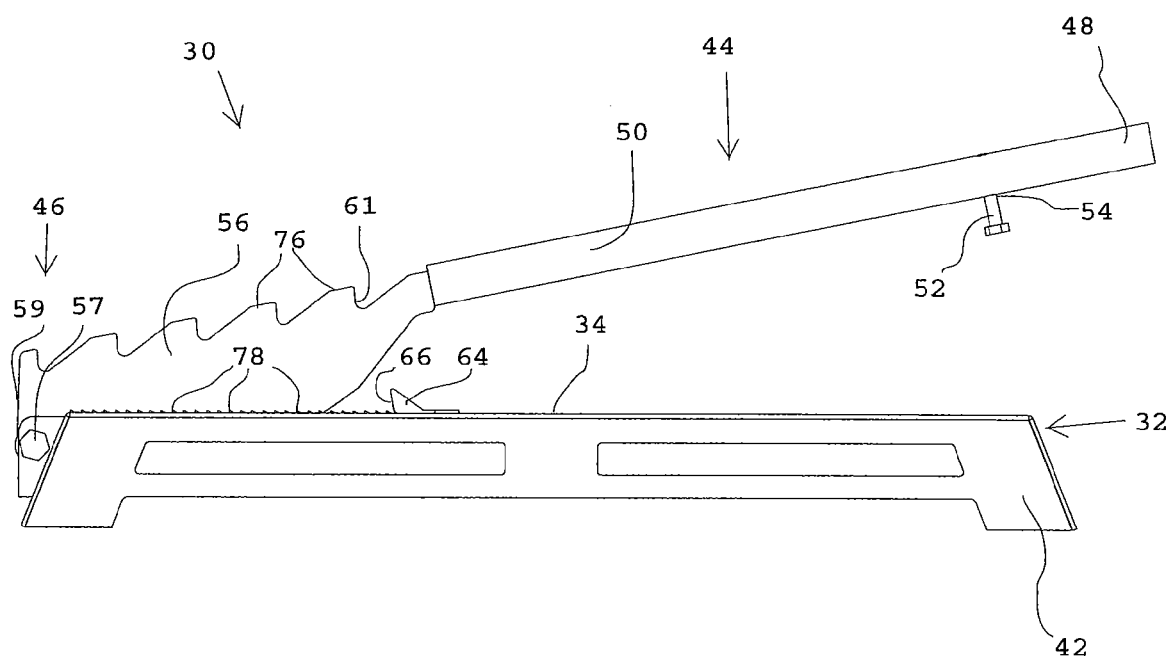
FIG. 15 is a side view of the cutting tool shown in FIG. 14.

In another embodiment of this invention, shown in FIGS. 14-15, the top edge 61 of the blade 56, opposite cutting surfaces 58, includes a plurality of ribs 76.

The base 32 preferably includes a slot 36 that extends through at least a portion of the base 32 and accommodates the blade 56 downward through its travel through the sheet of material 33. The slot 36 may receive a portion of the blade 56 when the handle 44 is in the closed position.

Figure 6:
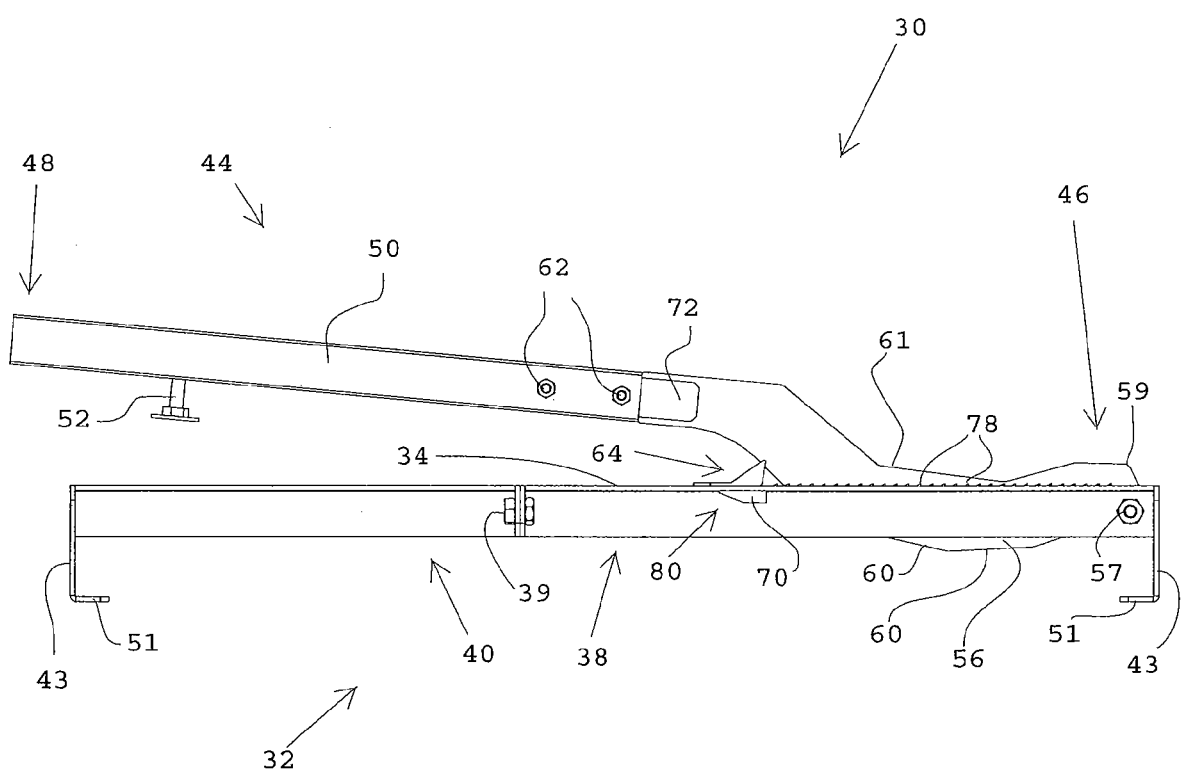
FIG. 6 is a side view of the cutting tool shown in FIG. 3, showing the side opposite the side shown in FIG. 3.
Figure 10:
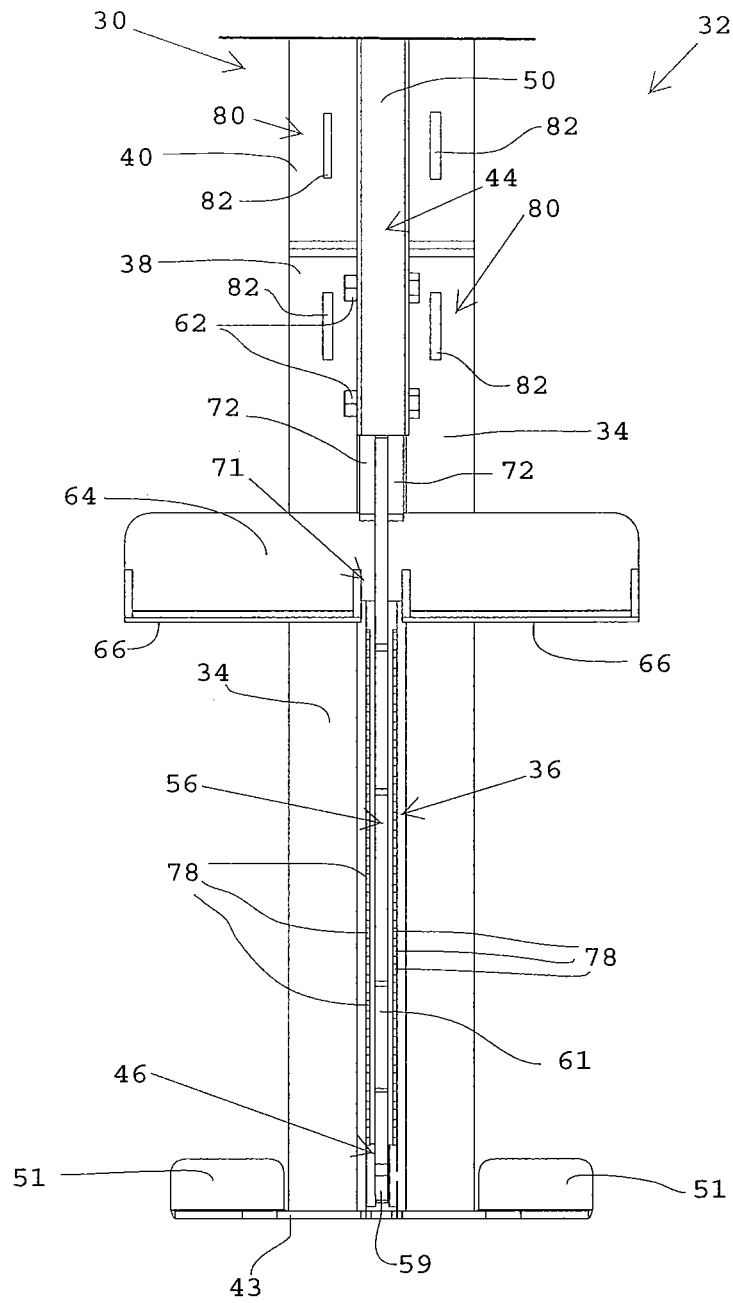
FIG. 10 is an exploded top view of the cutting tool shown in FIG. 9.

According to certain preferred embodiments of this invention best shown in FIGS. 3, 6, and 10 as well as 14, a plurality of serrations 78 or a similar surface feature may be positioned on either side of the slot 36 in part to maintain a positive grip on the sheet of material prior to and during the cut. In one embodiment of this invention, the plurality of serrations 78 include a plurality of teeth, where a tip of each tooth is oriented toward the proximate end 46 of the blade 56. In another embodiment of this invention, as best shown in FIG. 15, the plurality of serrations 78 include a plurality of teeth, where each tooth has a right-triangular profile, such that the right triangle is formed on the side of the tooth facing the proximate end 46 of the blade 56.

A high friction material such as, for example, rubber or similar material may be positioned on the support surface 34 on one or both sides of the slot 36.

The cutting tool 30 of this invention may further include a bracket 64, as shown in FIGS. 1, 13, 25 and 26. The bracket 64 is preferably used to provide an engagement surface with the laminate material to be cut. According to one embodiment of this invention, the bracket 64 includes a bracket body defining a material contact surface 66 and a base contact surface 68. The material contact surface 66 abuts and provides resistance to the sheet of material during cutting. The base contact surface 68 abuts the support surface 34 of the base 32. The bracket 64 may further include an indentation 71 formed in the material contact surface 68 to provide clearance for the blade 56 and/or the handle 44 as the handle 44 operates between the closed position and the open position. In certain embodiments of this invention, the bracket 64 further includes one or more lugs 70 extending from the base contact surface 68 of the bracket 64. Lugs 70 preferably engage the bracket 64 with the base 32.

According to certain preferred embodiments of the invention shown in FIGS. 1 and 13, the base 32 may further include one or more engagement areas 80 for repositioning the bracket 64 depending on the size and/or configuration of the laminate material. As shown, the engagement areas 80 may comprise one or more lug slots 82, each lug slot 82 being engageable with a lug 70 or a similar element in the bracket 64 to move the bracket 64 from a position near the slot 36 to one or more positions away from the slot 36.

In practice, a user would adjust the bracket 64 into a desirable position along the base 32 depending on the size of the sheet of material 33 to be cut. The handle 44 is raised up and away from the support surface 34, and then the sheet of material 33 would be positioned into place under the blade 56 and over the slot 36. One or more external markings may be positioned on or near the base 32 to gauge a proper position of the sheet of material 33 relative to the blade 56. Then the sheet of material 33 would be positioned to firmly abut the material contact surface 66 of the bracket 64 whereupon the handle 44 is lowered to cut the sheet of material 33 in a desired fashion.

According to preferred embodiments of this invention, the series of generally straight segments 60 comprising the profile of the blade 56 result in less work for a user than traditionally shaped cutting blades. In addition, the flat cutting surfaces 58 of the blade 56 result in a somewhat wide clean cut across the sheet of material 33.

The invention illustratively disclosed herein suitably may be practiced in the absence of any element, part, step, component, or ingredient, which is not specifically disclosed herein.

While in the foregoing specification this invention has been described in relation to certain preferred embodiments thereof, and many details have been set forth for purpose of illustration, it will be apparent to those skilled in the art that the laminate cutter is susceptible to additional embodiments and that certain of the details described herein can be varied considerably without departing from the basic principles of the invention.

What is claimed is:

1. A cutting tool for cutting a sheet of material, the cutting tool comprising:
   a base defining a support surface and including a slot extending through the support surface along at least a portion of the base, the support surface including a plurality of serrations;
   a handle having a proximate end pivotally engaged with respect to the base, the handle pivotally movable with respect to the base between an open position and a closed position; and
   a blade integrated with respect to the proximate end of the handle, the slot receiving at least a portion of the blade when the handle is in the closed position, the blade having three or more generally flat cutting surfaces arranged in a convex polygonal profile by being continuously connected in series along an entire length of the blade, each generally flat cutting surface is a straight segment, each straight segment abruptly transitions into at least one other straight segment and two adjacent straight segments form an angle of between about 90 degrees and 180 degrees.

2. The cutting tool of claim 1, wherein the base comprises at least one support member formed with respect to the base.

3. The cutting tool of claim 1, wherein the plurality of serrations are positioned along both edges of the support surface directly adjacent of the slot.

4. The cutting tool of claim 1, further comprising a handle stop extending from the handle toward the base and contacting the base when the handle is in the closed position.

5. The cutting tool of claim 1, wherein the base is separable into a first base member and a second base member along a longitudinal axis of the base.

6. The cutting tool of claim 1, wherein the handle further comprises a distal end opposite the proximate end, the distal end comprising a hand grip.

7. The cutting tool of claim 1, further comprising a bracket engaging the support surface, the bracket repositionably attachable at one of a plurality of engagement areas on the support surface.

8. The cutting tool of claim 7, wherein the bracket comprises at least one lug and each engagement area comprises at least one lug slot accommodating the at least one lug.

9. A cutting tool for cutting a sheet of material, the cutting tool comprising:
   a base defining a support surface;
   a slot extending through the support surface along at least a portion the base;
   a plurality of serrations positioned along both edges of the support surface directly adjacent the slot;
   a blade pivotally engaged with respect to the base and pivotally movable between an open position and a closed position, in the closed position the slot receiving at least a portion of the blade, the blade having three or more generally flat cutting surfaces arranged in a convex polygonal profile by being continuously connected in series along an entire length of the blade, each generally flat cutting surface is a straight segment having a width and a length, wherein each straight segment abruptly transitions into at least one other straight segment and two adjacent straight segments form an angle of between about 90 degrees and 180 degrees; and
   a hand grip formed with respect to the blade.

10. The cutting tool of claim 9, wherein the base is separable into a first base member and a second base member along a longitudinal axis of the base.

11. The cutting tool of claim 9, further comprising a bracket engaging the support surface, the bracket repositionably attachable at one of as plurality of engagement areas on the support surface, the bracket comprising, a lug removably engageable with a corresponding lug slot formed in each engagement area of the support surface.

12. The cutting tool of claim 10, wherein the blade defines an aperture through a pivot end thereof, the cutting tool further comprises a fastener extending through the aperture and a corresponding opening defined by the base, wherein the blade pivots about the fastener.

13. A cutting tool for cutting a sheet of material, the cutting tool comprising:
   a base defining a support surface;
   a slot extending through the support surface along at least a portion of the base;
   a plurality of serrations positioned along both edges of the support surface directly adjacent of the slot;
   a blade pivotally engaged with respect to the base and pivotally movable between an open position and a closed position, in the closed position the slot receiving at least a portion of the blade, the blade having three or more generally flat cutting surfaces arranged in a convex polygonal profile by being continuously connected in series along an entire length of the blade, each generally flat cutting surface is a straight segment having a width and a length, wherein each straight segment abruptly transition into at least one other straight segment and two adjacent straight segments form an angle of between about 90 degrees and 180 degrees;
   a hand grip attached to the blade; and
   a bracket engaging the support surface, the bracket comprising a plurality of lugs and being repositionably attachable at one of a plurality of engagement areas on the support surface, each engagement area comprising a plurality of lug slots receiving the plurality of lugs to attach the bracket to the support surface.

14. The cutting tool of claim 13, further comprising a handle stop extending from the hand grip toward the base.

15. The cutting tool of claim 13, wherein the base is separable into a first base member and a second base member along a longitudinal axis of the base.

16. The cutting tool of claim 13, wherein a top edge of the blade comprises a plurality of ribs.

* * * * *